United States Patent
Pettigrew et al.

(10) Patent No.: US 8,510,463 B2
(45) Date of Patent: Aug. 13, 2013

(54) SYSTEMS AND METHODS FOR FACILITATING COMMUNICATION WITH A FIELDBUS DEVICE

(75) Inventors: William Robert Pettigrew, Blacksburg, VA (US); Justin Brandon Chong, Christianburg, VA (US)

(73) Assignee: General Electric Company, Schenectady, NY (US)

(*) Notice: Subject to any disclaimer, the term of this patent is extended or adjusted under 35 U.S.C. 154(b) by 585 days.

(21) Appl. No.: 12/764,531

(22) Filed: Apr. 21, 2010

(65) Prior Publication Data

US 2011/0264240 A1 Oct. 27, 2011

(51) Int. Cl.
*G06F 15/16* (2006.01)

(52) U.S. Cl.
USPC .......................................................... 709/236

(58) Field of Classification Search
USPC ................. 710/105, 305; 370/466; 340/531; 709/236
See application file for complete search history.

(56) References Cited

U.S. PATENT DOCUMENTS

| | | | | |
|---|---|---|---|---|
| 7,809,449 | B2* | 10/2010 | Esch et al. ....................... | 700/21 |
| 8,315,718 | B2* | 11/2012 | Caffrey et al. ................... | 700/79 |
| 2003/0023795 | A1* | 1/2003 | Packwood et al. ............. | 710/105 |
| 2004/0054829 | A1* | 3/2004 | White et al. ................... | 710/105 |
| 2005/0066104 | A1* | 3/2005 | Train et al. ..................... | 710/305 |
| 2006/0140209 | A1* | 6/2006 | Cassiolato et al. ............. | 370/466 |
| 2006/0192671 | A1* | 8/2006 | Isenmann et al. .............. | 340/531 |
| 2010/0121999 | A1* | 5/2010 | Isenmann et al. .............. | 710/105 |
| 2011/0082570 | A1* | 4/2011 | Caffrey et al. ................... | 700/90 |
| 2011/0264240 | A1* | 10/2011 | Pettigrew et al. ................ | 700/7 |
| 2012/0147868 | A1* | 6/2012 | Williams et al. ............... | 370/338 |
| 2012/0306620 | A1* | 12/2012 | Karaffa et al. ................. | 340/6.1 |
| 2012/0306638 | A1* | 12/2012 | Karaffa et al. ................. | 340/517 |
| 2012/0306648 | A1* | 12/2012 | Karaffa et al. ................. | 340/540 |
| 2012/0306658 | A1* | 12/2012 | Karaffa et al. ................. | 340/679 |
| 2012/0310373 | A1* | 12/2012 | Karaffa et al. ................... | 700/11 |
| 2012/0310380 | A1* | 12/2012 | Karaffa et al. ................... | 700/80 |
| 2012/0310381 | A1* | 12/2012 | Karaffa et al. ................... | 700/80 |
| 2012/0310382 | A1* | 12/2012 | Karaffa et al. ................... | 700/80 |
| 2012/0310383 | A1* | 12/2012 | Karaffa et al. ................... | 700/80 |
| 2012/0310388 | A1* | 12/2012 | Karaffa et al. ................... | 700/90 |
| 2012/0311071 | A1* | 12/2012 | Karaffa et al. ................. | 709/217 |
| 2013/0053987 | A1* | 2/2013 | Galt et al. ........................ | 700/12 |

OTHER PUBLICATIONS

Fieldserver Technologies. "FieldServer Driver Fieldbus FS870412 GE-EGD (Ethernet Global Data)". Oct. 9, 2007. pp. 1-5.*

* cited by examiner

*Primary Examiner* — Imad Hussain
(74) *Attorney, Agent, or Firm* — Sutherland Asbill & Brennan LLP (57) ABSTRACT

Systems and methods for facilitating communication with a Fieldbus device are described. A first command formatted in accordance with a protocol other than a Fieldbus protocol may be received by a controller from an external computer, such as a human machine interface computer. The controller may determine that the received command is associated with the Fieldbus device. Based upon the determination and information included in the received first command, the controller may generate a second command formatted in accordance with the Fieldbus protocol. The second command may be output by the controller for communication to the Fieldbus device.

20 Claims, 3 Drawing Sheets

SYSTEMS AND METHODS FOR FACILITATING COMMUNICATION WITH A FIELDBUS DEVICE

FIELD OF THE INVENTION

Embodiments of the invention relate generally to control systems and more specifically to the facilitation of communications between a Fieldbus devices and a human machine interface included in a control system.

BACKGROUND OF THE INVENTION

Control systems are utilized in a wide variety of different applications. For example, control systems are utilized in conjunction with power generating devices, in power plants, and/or in process plants. A control system typically includes a central controller in communication with other components of the control system, for example, sensors, measurement devices, valves, etc. The central controller typically communicates with the other components via suitable network communications.

With the development and adoption of the Foundation Fieldbus standard, Fieldbus devices have been incorporated into control systems. Communication with Fieldbus devices is typically facilitated via a Foundation Fieldbus communications protocol. However, the Foundation Fieldbus protocol may be different than a protocol that facilitates communications between a central controller of the control system and other components of the control system, such as a workstation computer or other computer that serves as a human machine interface (HMI) for a control system. The existence of devices that utilize different protocols often leads to interconnectivity problems within the control system. Additionally, the use of different protocols may make it difficult for a HMI computer to read and write values to a Fieldbus device. Accordingly, improved systems and methods for facilitating communication with a Fieldbus device would be desirable.

BRIEF DESCRIPTION OF THE INVENTION

Some or all of the above needs and/or problems may be addressed by certain embodiments of the invention. Embodiments of the invention may include systems and methods for facilitating communication with a Fieldbus device in a control system. According to one embodiment of the invention, there is disclosed a method for facilitating communication with a Fieldbus device. A first command formatted in accordance with a protocol other than a Fieldbus protocol may be received from an external computer by a controller including one or more computers. The controller may determine that received command is associated with the Fieldbus device. Based upon the determination and information included in the received first command, the controller may generate a second command formatted in accordance with the Fieldbus protocol. The generated second command may be output by the controller for communication to the Fieldbus device.

According to another embodiment of the invention, there is disclosed a control system. The control system may include at least one memory and at least one processor. The at least one memory may be configured to store computer-executable instructions. The at least one processor may be configured to access the at least one memory and execute the computer-executable instructions to: receive, from an external computer, a first command formatted in accordance with a protocol other than a Fieldbus protocol; determine that the received command is associated with a Fieldbus device; generate, based upon the determination and information included in the received first command, a second command formatted in accordance with the Fieldbus protocol; and output the generated second command for communication to the Fieldbus device.

According to another embodiment of the invention, there is disclosed a method for facilitating communications between an external computer and a Fieldbus device. Information associated with the operation of the Fieldbus device may be received by a controller including one or more computers. At least a portion of the received information may be communicated by the controller to the external computer. A first command to modify the operation of the Fieldbus device may be received by the controller from the external computer. The first command may be formatted in accordance with a protocol other than a Fieldbus protocol. Based upon the first command, the controller may identify the Fieldbus device. Based upon the information included in the received first command, the controller may generate a second command formatted in accordance with the Fieldbus protocol. The generated second command may be output by the controller for communication to the Fieldbus device.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for facilitating communication with a Fieldbus device associated with a control system. More specifically, systems and methods for facilitating communication between an external computer, such as a human machine interface (HMI) computer and a Fieldbus device are disclosed. In certain embodiments of the invention, a controller associated with a control system may facilitate communications between a workstation computer or HMI computer and one or more Fieldbus devices. In this regard, the controller may receive commands formatted in accordance with a protocol other than a Fieldbus protocol from the HMI computer, generate commands formatted in accordance with the Fieldbus protocol, and output the generated commands for communication to one or more Fieldbus devices. For example, the controller may function as a gateway device that facilitates the reading and/or writing of Fieldbus data values and/or variables by the HMI computer. As one example, to facilitate the writing of a value to a Fieldbus device, the controller may receive a first command from an HMI computer directing that a value be written to a Fieldbus device. The controller may identify the Fieldbus device and generate, based upon information included in the first command, a second command formatted in accordance with the Fieldbus protocol. The second command may then be communicated to the identified Fieldbus device in order to complete the writing of the desired value.

Various embodiments of the invention may include one or more special purpose computers, systems, and/or particular machines that facilitate communication between an external computer and one or more Fieldbus devices. A special purpose computer or particular machine may include a wide variety of different software modules as desired in various embodiments. As explained in greater detail below, in certain embodiments, these various software components may be utilized to receive commands formatted in accordance with a non-Fieldbus protocol from an external computer, such as a HMI computer, and to generate suitable commands formatted in accordance with a Fieldbus protocol for output to one or more Fieldbus devices.

Certain embodiments of the invention described herein may have the technical effect of facilitating communication between an external computer, such as a HMI computer associated with a control system, and one or more Fieldbus devices. Additionally, certain embodiments of the invention may have the technical effect of processing commands received from an external computer in order to generate or produce commands that may be communicated to one or more Fieldbus devices. For example, certain embodiments may have the technical effect of receiving commands formatted in accordance with a non-Fieldbus protocol and generating commands formatted in accordance with a Fieldbus protocol for output to one or more Fieldbus devices.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet (HSE) devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a central controller of the control system. Additionally, the term HSE protocol may be utilized to refer to a Fieldbus protocol that facilitates communications with HSE Fieldbus devices.

Communications between Fieldbus devices and/or between one or more controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

Figure 1:
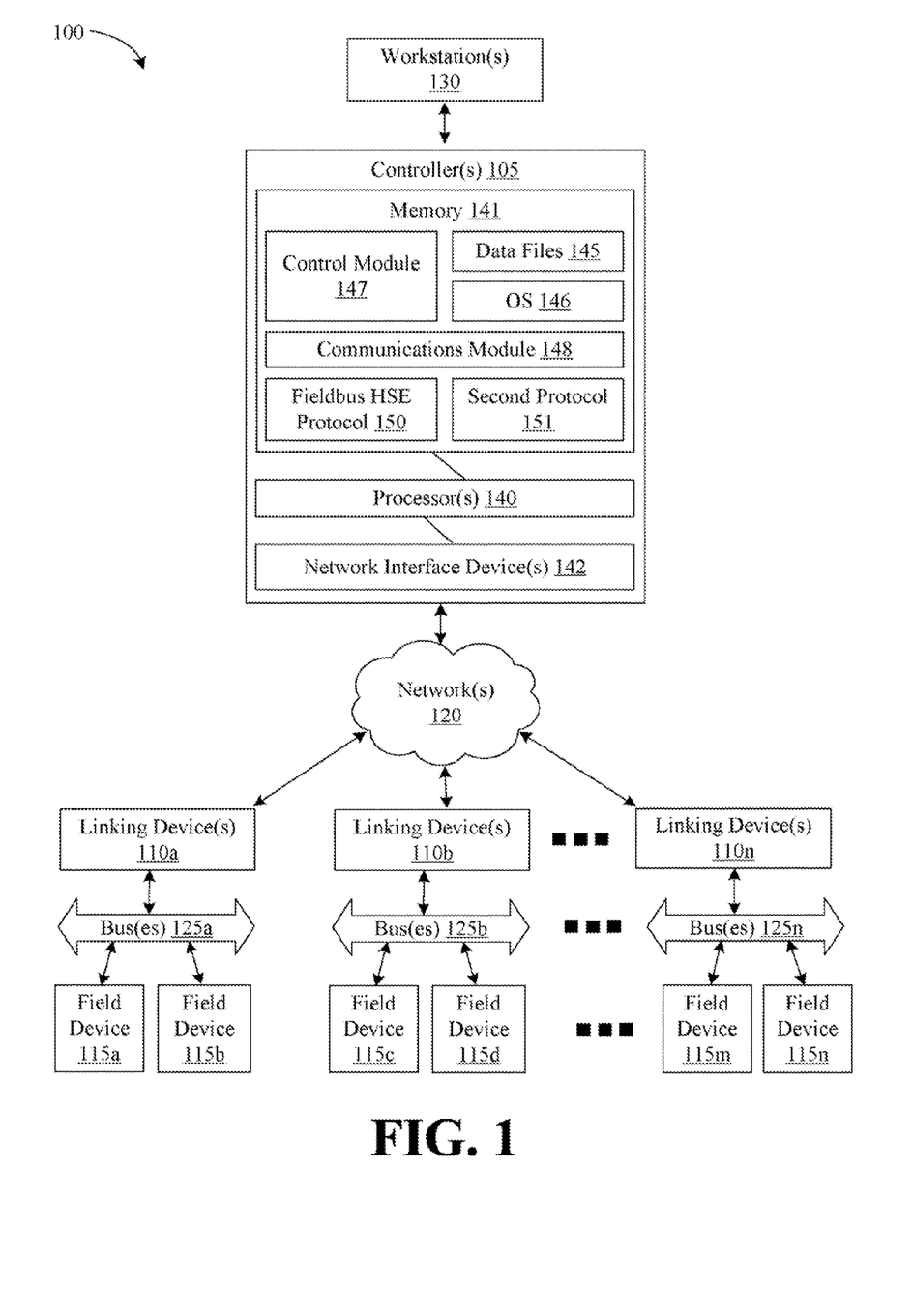
FIG. 1 is a schematic diagram of one example control system that may be utilized in accordance with various embodiments of the invention.

FIG. 1 is a block diagram of one example control system 100 that may be utilized in accordance with various embodiments of the invention. The control system 100 may include one or more controllers 105 (e.g., central controllers) and/or control devices, one or more linking devices 110a-n, one or more Fieldbus devices 115a-n, and/or one or more workstation computers 130 or HMI computers. The controller 105 may communicate with the linking devices 110a-n via one or more suitable networks 120 or communications buses. Additionally, the linking devices 110a-n may communicate with the various Fieldbus devices 115a-n via one or more suitable buses 125a-n or networks.

As desired in various embodiments of the invention, any number of workstations 130 or external computers may be provided. As desired, these workstations 130 may provide a human machine interface (HMI) between the control system 100 and one or more operators of the control system 100. For example, the workstations 130 may facilitate the receipt of user input and/or user commands associated with the operation of the control system 100. In other words, the workstations 130 may facilitate user interaction with the controller 105. Additionally, the workstations 130 may be configured to receive data from the controller 105, such as presentations and/or other information associated with the connected Fieldbus devices 115a-n. The workstations 130 may further be configured to display at least a portion of the received data to a user via a suitable display device, such as a monitor. In this regard, various data values associated with the operation of the Fieldbus devices 115a-n may be communicated to the workstations 130 for display to a user.

In certain embodiments, the workstations 130 may facilitate the receipt of user input associated with a command to be communicated to a Fieldbus device 115. For example, a command to write a value to a memory of a Fieldbus device 115 may be input into and/or generated by the workstations 130. An input or generated command may be communicated by the workstations 130 to the controller 105. The controller 105 may process a received command and facilitate the communication of the command to the Fieldbus device 115. In certain embodiments, the controller 105 may receive a command formatted in accordance with a non-Fieldbus protocol, utilize the received command to generate a command formatted in accordance with a Fieldbus protocol, and output the generated command for receipt by the Fieldbus device 115. In this regard, the controller may facilitate communication between the workstations 130 and the Fieldbus devices 115a-n. For example, the controller 105 may facilitate reading and/or writing values to and/or from the Fieldbus devices 115a-n by the workstations 130.

The workstations 130 may include one or more suitable computers or computing devices, such as personal computers, hand-held computing devices, mini-computers, etc.

Additionally, the workstations 130 may be in communication with the controller 105 via one or more suitable network connections, for example, a direct link or direct connection, a local area network, a wide area network, the Internet, a radio frequency (RE) network, a Bluetooth™ enabled network, any suitable wired network, or any suitable wireless network. In this regard, user commands, instructions, and/or other input associated with the operation of the control system 100 and the Fieldbus devices 115a-n may be received by the workstations 130 and communicated to the controller 105. Communications to the controller 105 may be formatted in accordance with a wide variety of suitable protocols, such as an Ethernet Global Data (EGD) protocol. According to an aspect of the invention, the protocol may be a protocol other than the Fieldbus protocol. Additionally, output data associated with the operations of the control system 100 and/or a plant or other system monitored by the control system 100, such as measurements data and/or data variables associated with the Fieldbus devices 115a-n, may be communicated to the workstations 130 by the controller 105 for output and/or display to a user.

With continued reference to FIG. 1, any number of linking devices 110a-n may be utilized in association with the control system 100. The linking devices 110a-n may be devices that are capable of communicating via a Fieldbus network or bus and via one or more relatively higher speed networks that facilitate communications with the controller 105. For example, a linking device (generally referred to as linking device 110) may be a HSE Fieldbus device or a combination HSE/H1 device. As such, the linking device 110 may be capable of communicating with the controller 105 via a suitable Ethernet network or other suitable network. Additionally, the linking device 110 may be capable of communicating with connected Fieldbus devices 115a-n via one or more Fieldbus networks and/or data buses. As desired, the linking devices 110a-n may facilitate communication between the controller 105 and the Fieldbus devices 115a-n. Alternatively, in other embodiments, a Fieldbus device 115 may be in direct communication with the controller 105 via a suitable network 120 or bus 125.

A linking device 110 may include any number of segments and/or connections to which a Fieldbus data bus 125 or local Fieldbus network may be connected. For example, in certain embodiments, a linking device 110 may include four (4) segments, although any other number of segments may be included as desired. Each segment may establish a separate communications channel and be configured to facilitate communications between the linking device 110 and the Fieldbus devices connected to the segment.

With continued reference to FIG. 1, any number of Fieldbus devices 115a-n may be utilized in association with the control system 100. In certain embodiments, each Fieldbus device (generally referred to as device 115) may be in communication with a linking device 110 via a local Fieldbus network or data bus 125. In this regard, communications between the Fieldbus device 115 and the controller 105 may be facilitated by the linking device 110. In other embodiments, a Fieldbus device 115 may be in direct communication with a controller 105. A wide variety of different types of Fieldbus devices may be utilized as desired in various embodiments of the invention, including any number of H1 Fieldbus devices and/or other suitable devices. In certain embodiments, the Fieldbus devices 115a-n may be distributed or situated at varying points within a power plant or process plant. In this regard, the Fieldbus devices 115a-n may be utilized to monitor and/or control various aspects and/or operations of a plant.

As desired, a Fieldbus device 115 may include a memory that is configured to store any number of data values, such as data values associated with one or more variables for the Fieldbus device 115. For example, data values for variables associated with operating parameters for the Fieldbus device 115 (e.g., a mode of operation for the device, etc.) may be stored. As desired, a stored data value, such as a value of a variable, may be output by the Fieldbus device 115 for communication to the controller 105. For example, a stored data value may be periodically output by the Fieldbus device 115 at a predetermined time interval (e.g., once every 500 milliseconds, etc.). As another example, a stored data value may be output when the data value is altered, updated, or changed. Additionally, as desired, the Fieldbus device 115 may be configured to received commands associated with operation of the Fieldbus device 115. For example, a command to alter a data value of an operating variable of the Fieldbus device 115 or a command to write a particular value to a memory location of the Fieldbus device 115 may be received. Based upon the receipt of a command to alter a data value, the Fieldbus device 115 may alter or update a stored data value.

In certain embodiments, communications between the linking devices 110a-n and the Fieldbus devices 115a-n may be facilitated using the Fieldbus protocol. Additionally, communications between the linking devices 110a-n and the controller 105 may be facilitated using the Fieldbus protocol.

With continued reference to FIG. 1, the one or more illustrated networks 120 may include any suitable network or combination of networks that facilitate communications between the linking devices 110a-n and the controller 105. Similarly, the Fieldbus data buses 125a-n or networks may include any number of suitable data buses and/or local area networks that facilitate communication between a linking device 110 and Fieldbus devices that are connected to the linking device 110. Examples of suitable networks and/or data buses include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network 120. Each of the Ethernet switches may include hardware and/or software components that are operable to facilitate the routing of data within the network 120. Examples of suitable Ethernet switches include, but are not limited to, network bridges, multilayer switches, etc.

As desired in various embodiments of the invention, redundant components may be provided within the network 120 and/or the system 100. For example, redundant wiring, switches, and/or routers may be provided. Additionally, in certain embodiments redundant linking devices 110a-n and/or segments may be provided. In this regard, adequate operations may be maintained within the control system 100 in the event of failure of network device.

With continued reference to FIG. 1, the control system 100 may include a controller 105, such as a central controller. Some examples of suitable controllers are a Mark™ VI control system and a Mark™ Vie control system produced by the General Electric Company. The controller 105 may be configured to communicate with and/or control other components of the control system 100 and/or components of the plant or system that is controlled by the control system 100. Additionally, the controller 105 may be configured to receive data associated with the operation of the Fieldbus devices 115a-n and/or the linking devices 110a-n, to process at least a portion of the received data, and/or to output information associated with at least a portion of the received data to the workstations 130. Additionally, the controller 105 may be operated to generate one or more control signals or other messages for receipt by any number of linking devices 110a-n and/or Fieldbus devices 115a-n. In certain embodiments, the generated control signals and/or messages may be generated based upon commands and/or messages received from the workstations 130. In this regard, the controller 105 may facilitate communications between the workstations 130 and the Fieldbus devices 115a-n.

The controller 105 may include any number of processor driven devices that control the operations of the control system 100. For example, the controller 105 may include any number of special purpose computers or particular machines, application specific circuits, programmable logic controllers (PLC), microcontrollers, personal computers, minicomputers, mainframe computers, supercomputers, and the like. In certain embodiments, the operations of the controller 105 may be controlled by computer-executed or computer-implemented instructions that are executed by one or more processors associated with the controller 105. The instructions may be embodied in one or more software components as desired in various embodiments of the invention. The execution of the instructions may form a special purpose computer or other particular machine that is operable to control the operations of the control system 100 and/or to facilitate communications between the workstations 130 and the Fieldbus devices 115a-n. The one or more processors that control the operations of the controller 105 may be incorporated into the controller 105 and/or in communication with the controller 105 via one or more suitable networks. In certain embodiments of the invention, the operations and/or control of the controller 105 may be distributed amongst several processing components.

The controller 105 may include one or more processors 140, one or more memory devices 141, and one or more network interface device(s) 142. The one or more memory devices 141 may be any suitable memory devices, for example, caches, read only memory devices, random access memory devices, magnetic storage devices, etc. The one or more memory devices 141 may store data, executable instructions, and/or various program modules utilized by the controller 105, for example, data 145 associated with the operation of the control system, an operating system 146, a control module 147, and a communications module 148. Additionally, the memory 141 may be operable to store a Fieldbus or HSE protocol 150 and/or a second control system protocol 151 that facilitates communication with other components of the control system 100, such as the workstations 130. A wide variety of second protocols may be utilized as desired in various embodiments, such as an Ethernet Global Data (EGD) protocol. The data 145 may include any suitable data associated with the operation of the control system 100 and/or the operation of the plant or system monitored by the control system 100, for example, measurements data, operating data, data associated with the operation of the workstations 130, data associated with the operation of one or more linking devices 110a-n, data associated with the operation of one or more Fieldbus devices 115a-n, etc.

Additionally, in certain embodiments, the data 145 may include identifying information for one or more variables associated with the Fieldbus devices 115a-n and/or linking devices 110a-n. Information associated with a wide variety of different variables may be stored as desired in various embodiments of the invention, such as information for variables associated with a mode of operation of a Fieldbus device 115 or a linking device 110. Additionally, a wide variety of different information may be stored for a variable, including but not limited to, an identification of a Fieldbus device 115 or linking device 110 associated with the variable, a memory address or memory location within the Fieldbus device 115 or linking device 110 at which the variable is stored, access information for the variable (e.g., read and/or write permission data), and/or a current value of a variable. In certain embodiments, a table may be utilized in order to map or otherwise associate variables with their applicable Fieldbus devices 115a-n and/or linking devices 110a-n. In this regard, when commands to read a variable and/or write to a variable are received from a workstation 130, a device (e.g., a Fieldbus device 115) associated with the variable and/or a memory location within the device 115 may be accessed or identified.

The operating system (OS) 146 may include executable instructions and/or program modules that facilitate and/or control the general operation of the central controller 105. For example, the OS 146 may facilitate the execution of other software programs and/or program modules by the processors 140. The control module 147 may be operable to monitor and/or control the overall operations of the control system 100 and/or the plant or system that is monitored and/or controlled by the control system 100. In doing so, the control module 147 may utilize various measurements and/or other data associated with the operation of the control system 100 and/or the monitored plant or system. The control module 147 may also utilize various commands received from the workstations 130. At least a portion of the utilized data may be received from the Fieldbus devices 115a-n either directly or via the linking devices 110a-n. The control module 147 may be further operable to generate command signals associated with the operation of the control system 100 and to direct the communication of the generated signals to other components of the control system 100, for example, to the Fieldbus devices 115a-n. For example, the control module 147 may be operable or configured to process data received from one or more Fieldbus devices 115a-n and/or commands received from the workstations 130 and to direct the communication of generated control signals or other messages to the Fieldbus devices 115a-n.

The communications module 148 may be operable to format and/or generate communications to be transmitted over the network 120 and/or communications to be transmitted to the workstations 130. Additionally, the communications module may be operable to receive communications that have been transmitted to the central controller 105, such as communications received from the workstations 130, the linking devices 110a-n, and/or the Fieldbus devices 115a-n, and to extract and process data from the received communications. The communications module may utilize both the Fieldbus or HSE protocol 150 and/or one or more other protocols, such as the control system or second protocol 151, during the formatting of communications.

According to an aspect of the invention, the communications module 148 may be operable to facilitate communications between the workstations 130 and the Fieldbus devices 115a-n. For example, the communications module 148 may be configured to receive commands from the workstations 130 that are associated with one or more Fieldbus devices 115a-n. In one example embodiment, a user of the workstations 130 may input one or more commands associated with the operation of the Fieldbus devices 115a-n, such as a command to modify a mode of operation of a Fieldbus device 115, and the input commands may be communicated to the controller 105 for processing by the communications module 148 and/or the control module 147. The received commands may be formatted in accordance with a protocol other than the Fieldbus protocol. Once a command, such as a command to read or write a value to a Fieldbus device, is received, the communications module 148 may identify the command as a command for a Fieldbus device 115. For example, the communications module 148 may identify a variable associated with or referenced by the received command as a variable associated with the Fieldbus device 115 by comparing the variable included in the command to stored information associated with variables for the Fieldbus devices 115*a-n*. In one example, embodiment, a variable included in a received command may be utilized to access and/or search a data repository of variables for the Fieldbus devices 115*a-n*, such as a look up table of variables or a database of variables. In this regard, a Fieldbus device 115 associated with the received command may be identified.

Once a Fieldbus device 115 associated with the received command is identified, the communications module 148 may convert or translate the received command into a command that is formatted in accordance with the Fieldbus protocol. In certain embodiments, the communications module 148 may utilize at least a portion of the information included in the received command to generate a second command formatted in accordance with the Fieldbus protocol. As desired, the communications module 148 may additionally utilize a portion of the stored data 145, such as a stored memory address for a variable associated with the command, in order to generate the second command. For example, the generated second command may include memory address information for a Fieldbus device 115 at which a variable or parameter to be modified is stored. Once generated, the communications module 148 may direct the communication of the second command to the identified Fieldbus device 115. In this regard, the communications module 148 may function as a gateway module that facilitates communications between the non-Fieldbus workstations 130 and the Fieldbus devices 115*a-n*.

In addition to processing commands received from the workstations 130, the communications module 148 and/or the control module 147 may be operable to receive information from the Fieldbus devices 115*a-n* and communicate at least a portion of the received information to the workstations 130 for presentation to a user. For example, a Fieldbus device 115 may communicate information associated with the operation of the Fieldbus device 115, such as values of one or more operating variables and/or parameters for the Fieldbus device 115, measurements data, calculations, and/or other data to the controller 105. In certain embodiments, information may be communicated by a Fieldbus device 115 to the controller 105 in real time or near real time. In other embodiments, information may be periodically communicated by the Fieldbus device 115 to the controller 105 at a suitable predetermined time interval. In other embodiments, information may be communicated by the Fieldbus device 115 to the controller 105 in response to a request for the information, such as a request or command to read the value of an operating variable associated with the Fieldbus device 115. In yet other embodiments, information may be communicated by the Fieldbus device 115 to the controller 105 based upon the identification of a triggering event by the Fieldbus device 115, such as an identified change of an operating variable or a determination that a measurement value falls outside of a threshold value or range of threshold values. Communications by the Fieldbus device 115 to the controller 105 may be formatted in accordance with the Fieldbus protocol.

Once received, at least a portion of the information may be utilized by the communications module 148 to generate a message formatted in accordance with a protocol other than the Fieldbus protocol (e.g., an EGD protocol). The communications module 148 may then direct the output of the generated message for communication to the workstations 130. In this regard, information received from a Fieldbus device 115 may be converted or translated into a protocol or language associated with the workstations 130 and communicated to the workstations 130 for display to a user. A user of the workstation 130 may then view the displayed information and determine whether any changes in the operation of the Fieldbus device 115 are desired. If a change is desired, the user may utilized the workstation 130 to communicate a command to the controller 105 as described in greater detail above.

An example of the operations that may be performed by the communications module 148 to facilitate communications between the workstations 130 and one or more Fieldbus devices 115*a-n* is set forth in greater detail below with reference to FIGS. 2 and 3.

With continued reference to FIG. 1, the network interface devices 144 may facilitate connection of the controller 105 to the network 120 and/or to the workstations 130. The network interface devices 144 may include any number of input/output cards (e.g., Ethernet cards) and/or other devices that facilitate network communications.

As desired, embodiments of the invention may include a control system 100 with more or less than the components illustrated in FIG. 1. The control system 100 of FIG. 1 is provided by way of example only.

Figure 2:
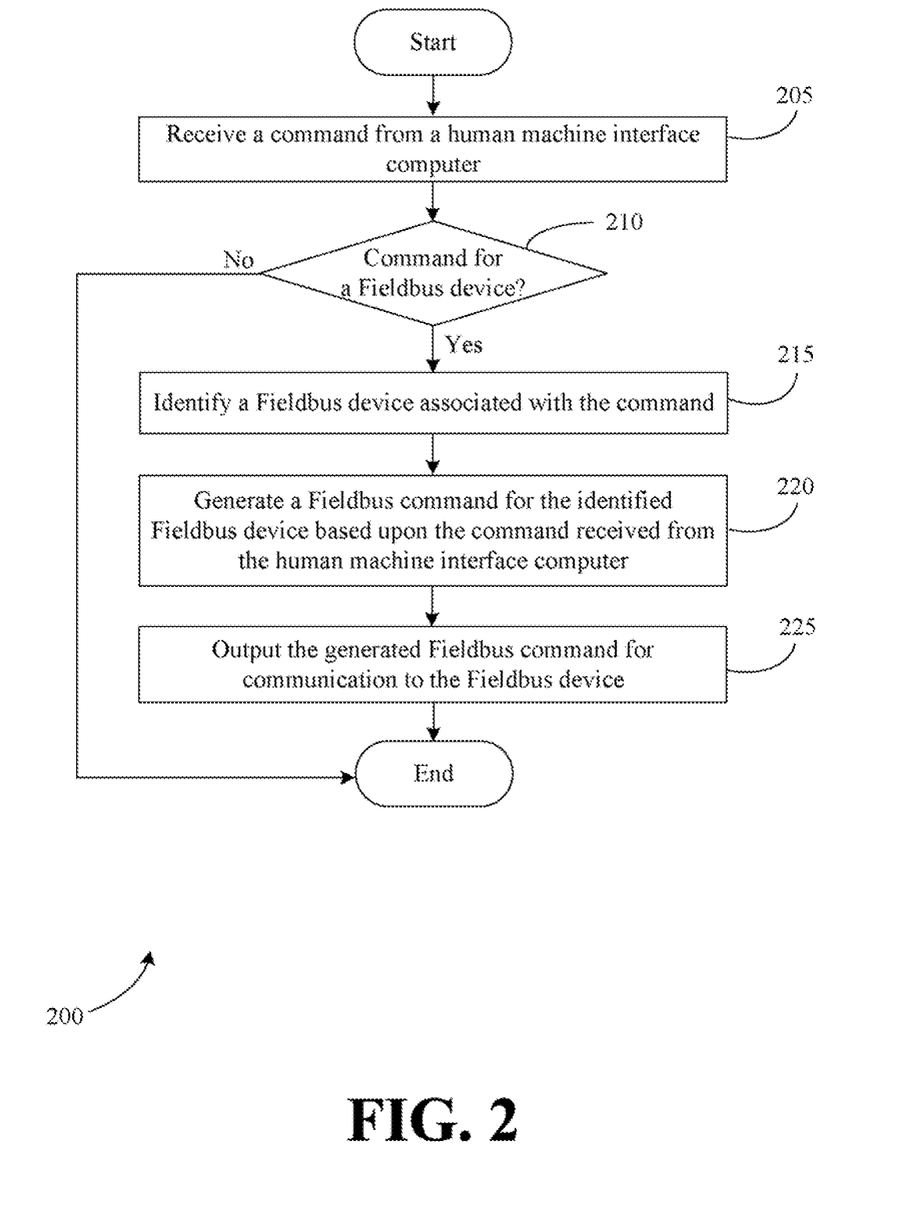
FIG. 2 is a flow chart of one example method for communicating a command received from an external computer to a Fieldbus device, according to an illustrative embodiment of the invention.

FIG. 2 is a flow chart of one example method 200 for communicating a command received from an external computer to a Fieldbus device, according to an illustrative embodiment of the invention. The method 200 may be performed by a suitable controller associated with a control system, such as the controller 105 associated with the control system 100 of FIG. 1. The method may begin at block 205.

At block 205, a command associated with the operation of the control system 100 may be received from a human machine interface (HMI) computer, such as one of the workstations 130 illustrated in FIG. 1. The command may be received via any number of suitable networks and/or network connections, such as via a network that is similar to the networks 120 described above with reference to FIG. 1. Additionally, the received command may be formatted in accordance with a protocol other than a Fieldbus protocol. For example, in certain embodiments, the received command may be formatted in accordance with an EGD protocol or another suitable protocol.

At block 210, a determination may be made as to whether the command is a command for a Fieldbus device, such as one of the Fieldbus devices 115*a-n* illustrated in FIG. 1. In certain embodiments, information included in the command may be analyzed in order to determine whether the command is a command for a Fieldbus device 115. For example, a device identifier included in the command may be identified, and a determination may be made as to whether the device identifier is associated with a Fieldbus device 115. As another example, a variable or parameter included in or identified by the command may be analyzed, and a determination may be made as to whether the variable is associated with a Fieldbus device 115. For example, a variable included in the command may be utilized to access or search a database or lookup table that includes variables associated with any number of Fieldbus devices 115*a-n*. Based upon the identification of a match, a Fieldbus device 115 associated with the variable may be identified. If it is determined at block 210 that the command is not a command for a Fieldbus device 210, then the method 200 may end. However, if it is determined at block 210 that the command is a command for a Fieldbus device 115, then operations may continue at block 215 and the Fieldbus device 115 associated with the command may be identified. For example, a device identifier or a variable included in the command may be utilized to identify the Fieldbus device 115 associated with the command.

At block 220, a Fieldbus command for the identified Fieldbus device 115 may be generated based upon the command received from the HMI computer. For example, information included in the received command and/or stored information associated with a variable or parameter identified by the received command (e.g., an identifier of the Fieldbus device 115, a memory location of the Fieldbus device 115 that is associated with the variable, etc.) may be utilized to generate a Fieldbus command that is formatted in accordance with the Fieldbus protocol. In this regard, the command received from the HMI computer may be converted or translated into a command formatted in accordance with the Fieldbus protocol.

At block 225, the generated Fieldbus command may be output for communication to the Fieldbus device 115. For example, the Fieldbus command may be communicated directly to a Fieldbus device 115. As another example, the Fieldbus command may be communicated to a linking device 110 for delivery to a Fieldbus device 115.

The method 200 may end following either block 210 or 225.

A wide variety of command may be received from an HMI computer and processed by the controller 105 and/or the communications module 148. One example of a suitable command that may be processed is a command to write a value to a Fieldbus device. FIG. 3 is a flow chart of one example method 300 for facilitating the writing of a value to a Fieldbus device by an external computer, according to an illustrative embodiment of the invention. The method 300 may be performed by a suitable controller associated with a control system, such as the controller 105 associated with the control system 100 of FIG. 1. The method may begin at block 305.

At block 305, command to write a value to a Fieldbus device, such as a Fieldbus device 115 illustrated in FIG. 1, may be received from a human machine interface (HMI) computer, such as one of the workstations 130 illustrated in FIG. 1. The command may be received via any number of suitable networks and/or network connections, such as via a network that is similar to the networks 120 described above with reference to FIG. 1. Additionally, the received command may be formatted in accordance with a protocol other than a Fieldbus protocol. For example, in certain embodiments, the received command may be formatted in accordance with an EGD protocol or another suitable protocol.

At block 310, a variable or parameter associated with the received write command may be identified. For example, a variable or parameter to which a value is desired to be written may be identified. At block 315, a determination may be made as to whether a Fieldbus device 115 is identified based upon the variable. For example, the variable may be utilized to search or access a lookup table or database of variables associated with Fieldbus devices 115a-n, and a determination may be made that the variable is associated with a Fieldbus device 115 if a match is found. If it is determined at block 315 that no Fieldbus device is identified by or associated with the variable, then operations may end. If however, it is determined at block 315 that a Fieldbus device 115 is identified by or associated with the variable, then operations may continue at block 320.

At block 320, a determination may be made as to whether writing to the identified variable is allowed or permitted. In certain embodiments, a determination may be made as to whether the HMI computer has permission or access rights to write a value to the identified variable. For example, stored information associated with write permission and/or access writes may be examined in order to determine whether writing to the identified variable is allowed or permitted. If it is determined at block 320 that writing to the identified variable is not allowed, then operations may end. If, however, it is determined at block 320 that writing to the variable is permitted, then operations may continue at block 325.

At block 325, a second write command for the variable may be generated utilizing the Fieldbus protocol. As, desired, the generation of the second write command may be based upon the command received from the HMI computer. For example, information included in the received write command may be utilized to generate a Fieldbus write command. Additionally, as desired, stored information associated with the identified variable or parameter, such as an identifier of the Fieldbus device 115 and/or a memory location or memory address of the Fieldbus device 115 at which a value of the variable is stored, may be utilized to generate the Fieldbus write. In this regard, the command received from the HMI computer may be converted or translated into a command formatted in accordance with the Fieldbus protocol.

At block 330, the generated Fieldbus write command may be output for communication to the Fieldbus device 115. For example, the Fieldbus write command may be communicated directly to the Fieldbus device 115. As another example, the Fieldbus command may be communicated to a linking device 110 for delivery to the Fieldbus device 115.

Embodiments of the invention may facilitate the writing, by an HMI computer, of values to a wide variety of different variables or parameters associated with a Fieldbus device 115. For example, embodiments of the invention may facilitate the writing of a value to an operating mode or operational mode associated with a Fieldbus device 115. In this regard, the HMI computer may be utilized to set an operating mode of the Fieldbus device 115. For example, an operating mode may be set to one of a manual operating mode, an out of service operating mode, an automatic operating mode, or any other suitable operating mode.

At block 335, which may be optional in certain embodiments of the invention, information associated with the operation of the Fieldbus device 115 may be received by the controller 105. For example, measurements data and/or data associated with the values of one or more variables and/or parameters for the Fieldbus device 115 may be received. The received information may be formatted in accordance with the Fieldbus protocol.

At block 340, which may be optional in certain embodiments of the invention, at least a portion of the received information may be utilized to generate a message for output to the HMI computer. For example, a message that includes an updated value of the variable that was written to may be generated. The generated message may be formatted in accordance with a protocol other than the Fieldbus protocol, such as an EGD protocol. Once generated, the message may be output at block 345 for communication to the HMI computer and/or presentation to a user of the HMI computer. In this regard, the controller 105 may function as a gateway device that facilitates communications between the Fieldbus device 115 and the HMI computer.

Figure 3:
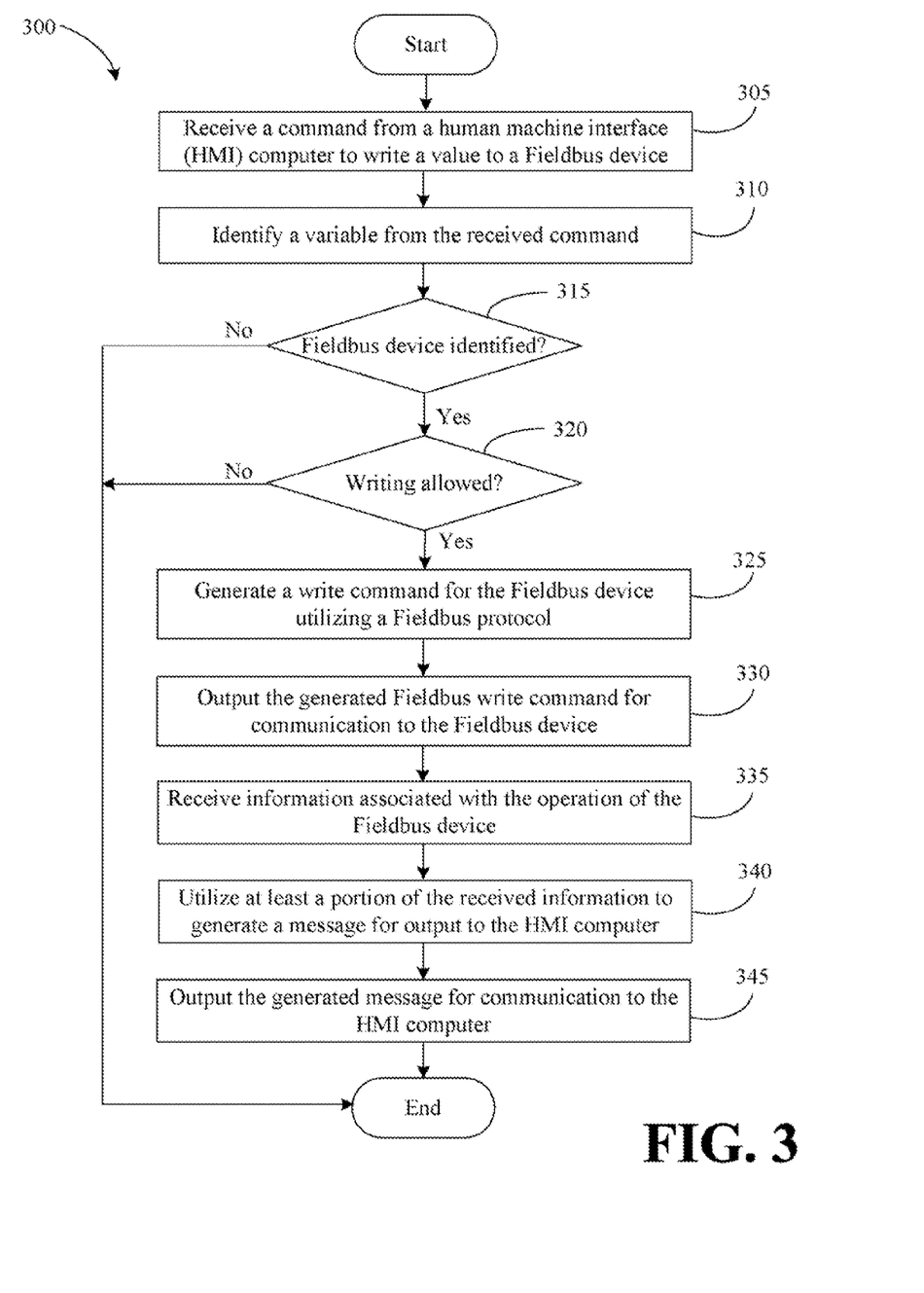
FIG. 3 is a flow chart of one example method for facilitating the writing of a value to a Fieldbus device by an external computer, according to an illustrative embodiment of the invention.

Although the communications from the Fieldbus device 115 to the HMI computer are described in FIG. 3 as occurring after a variable associated with the Fieldbus device is written to, in certain embodiments of the invention, information associated with variable values and/or measurements data may additionally or alternatively be communicated to the HMI computer prior to receiving a command to write a value to the Fieldbus device 115.

The method may end following either block 315, 320, or 345.

The operations described in the methods 200, 300 of FIGS. 2 and 3 do not necessarily have to be performed in the order set forth in FIGS. 2 and 3, but instead may be performed in any suitable order. Additionally, in certain embodiments of the invention, more or less than all of the elements or operations set forth in FIGS. 2 and 3 may be performed.

Although the methods 200, 300 of FIGS. 2 and 3 describe the receipt of commands for Fieldbus devices 115*a-n*, similar operations may be performed as desired to receive and process commands for one or more linking devices 110*a-n*.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for facilitating communication with a Fieldbus device, the method comprising:
   receiving, from an external computer by a controller comprising one or more computers, a first command generated by the external computer and formatted in accordance with an Ethernet Global Data (EGD) protocol;
   determining, by the controller, that the received command is associated with the Fieldbus device;
   generating, by the controller based upon the determination and information included in the received first command, a second command formatted in accordance with the Fieldbus protocol; and
   outputting, by the controller, the generated second command for communication to the Fieldbus device.

2. The method of claim 1, wherein determining that the received first command is associated with the Fieldbus device comprises:
   identifying a variable included in the received first command; and
   determining that the identified variable is associated with the Fieldbus device.

3. The method of claim 2, wherein determining that the identified variable is associated with the Fieldbus device comprises:
   comparing the identified variable to one or more stored variables associated with the Fieldbus device; and
   determining that the identified variable is associated with the Fieldbus device based at least in part on the comparison.

4. The method of claim 1, wherein receiving a command from the external computer comprises receiving a command from a human machine interface computer.

5. The method of claim 1, wherein outputting the generated second command comprises communicating the generated second command to a linking device configured to facilitate communications between the controller and the Fieldbus device.

6. The method of claim 1, further comprising:
   receiving, by the controller, information associated with the operation of the Fieldbus device, wherein the information is formatted in accordance with the Fieldbus protocol;
   generating, by the controller utilizing at least a portion of the received information, a message associated with the operation of the Fieldbus device, wherein the message is formatted in accordance with the EGD protocol; and outputting, by the controller, the generated message for communication to the external computer.

7. The method of claim 1, wherein receiving a first command comprises receiving a first command to write a value to a variable associated with the Fieldbus device.

8. The method of claim 7, wherein receiving a command to write a value to a variable comprises receiving a command to alter a mode of operation associated with the Fieldbus device.

9. The method of claim 7, further comprising:
determining, by the control, that writing to the variable is permitted for the external computer.

10. A control system comprising:
at least one memory operable to store computer-executable instructions; and
at least one processor configured to access the at least one memory and execute the computer-executable instructions to:
receive, from an external computer, a first command generated by the external computer and formatted in accordance with an Ethernet Global Data (EGD) protocol;
determine that the received command is associated with a Fieldbus device;
generate, based upon the determination and information included in the received first command, a second command formatted in accordance with the Fieldbus protocol; and
output the generated second command for communication to the Fieldbus device.

11. The control system of claim 10, wherein the at least one processor is configured to determine that the received first command is associated with a Fieldbus device by executing the computer-executable instructions to:
identify a variable included in the received first command; and
determine that the identified variable is associated with the Fieldbus device.

12. The control system of claim 11, wherein the at least one processor is configured to determine that the identified variable is associated with the Fieldbus device by executing the computer-executable instructions to:
compare the identified variable to one or more stored variables associated with the Fieldbus device; and
determine that the identified variable is associated with the Fieldbus device based at least in part on the comparison.

13. The control system of claim 10, wherein the external computer comprises a human machine interface computer.

14. The control system of claim 10, wherein the output second command is communicated to a linking device configured to facilitate communications with the Fieldbus device.

15. The control system of claim 10, wherein the at least one processor is further configured to execute the computer-executable instructions to:
receive information associated with the operation of the Fieldbus device, wherein the information is formatted in accordance with the Fieldbus protocol;
generate, utilizing at least a portion of the received information, a message associated with the operation of the Fieldbus device, wherein the message is formatted in accordance with the EGD protocol; and
output the generated message for communication to the external computer.

16. The control system of claim 10, wherein the first command comprises a command to write a value to a variable associated with the Fieldbus device.

17. The control system of claim 16, wherein the command to write a value to a variable comprises a command to alter a mode of operation associated with the Fieldbus device.

18. The control system of claim 16, wherein the at least one processor is further configured to execute the computer-executable instructions to:
determine that writing to the variable is permitted for the external computer.

19. A method for facilitating communications between an external computer and a Fieldbus device, the method comprising:
receiving, by a controller comprising one or more computers, information associated with the operation of the Fieldbus device;
communicating, by the controller to the external computer, at least a portion of the received information;
receiving, from the external computer by the controller, a first command to modify the operation of the Fieldbus device, wherein the first command is generated by the external computer and formatted in accordance with an Ethernet Global Data (EGD) protocol;
identifying, by the controller and based upon the first command, the Fieldbus device;
generating, by the controller based upon the information included in the received first command, a second command formatted in accordance with the Fieldbus protocol; and
outputting, by the controller, the generated second command for communication to the Fieldbus device.

20. The method of claim 19, wherein receiving a first command comprises receiving a first command to alter a mode of operation of the Fieldbus device.

* * * * *